3,182,460
APPARATUS FOR MAKING PERMEABLE CONDUITS IN SUBTERRANEAN LINES OF DRAINAGE
Harry D. Durston, Pasco, and Alfred Perry, Moses Lake, Wash., assignors to J. A. Terteling & Sons, Inc., Boise, Idaho, a corporation of Idaho
Filed Mar. 18, 1964, Ser. No. 352,866
13 Claims. (Cl. 61—63)

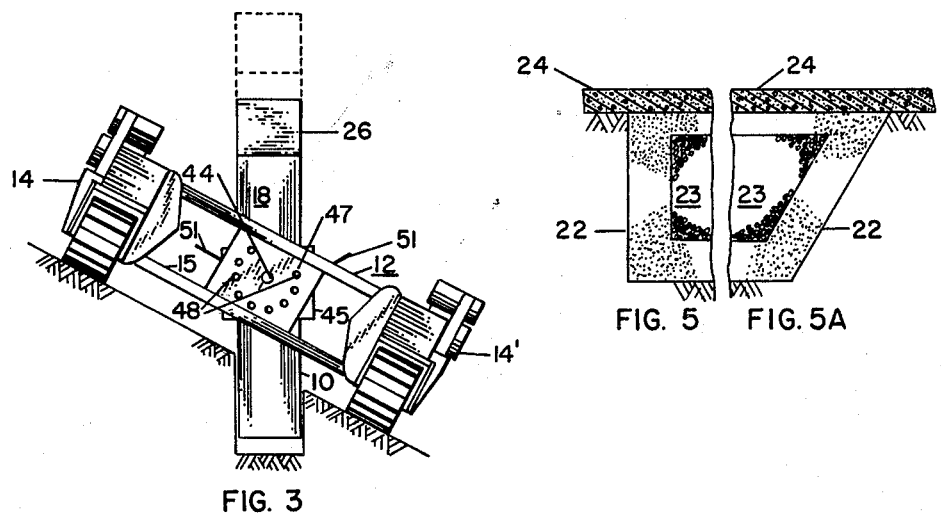
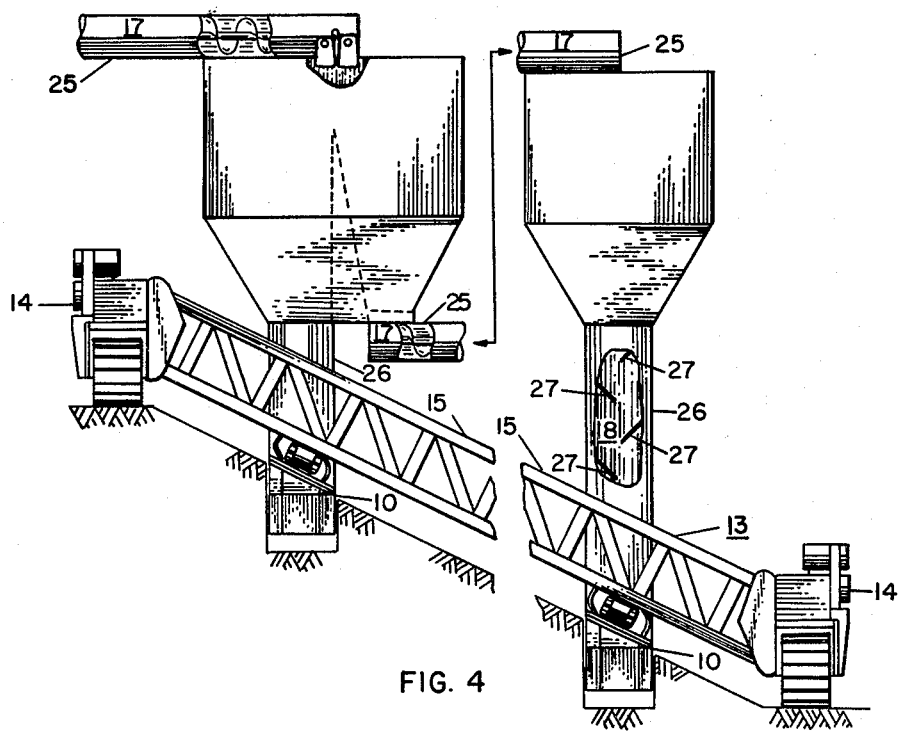
FIG. 3
FIG. 5    FIG. 5A
FIG. 4

The present invention relates to a method and apparatus for making permeable conduits in subterranean lines of drainage, and, more particularly, to method and apparatus operable to separately backfill, form, and densify, in a composite operation, a plurality of porous materials, each of a selected particle size, in excavated trenches to make filtered, free-flowing conduits for penetrating and percolating water.

In the construction of such surface structures as roads, runways, channels, levees, canals, and the like, it is desirable to provide permeable free-flowing subterranean lines of drainage to collect and carry away transuding, percolating and penetrating water. Aluvium or detrital materials which may form an earth foundation for surface structures tend to become unstable by reason of physical changes induced by such water. Hydrostatic pressures also may be created by the collection of sub-surface water where impervious wearing surfaces such as blankets or linings of surface structures are to be supported.

In order to provide optimum stability, subterranean lines of drainage are preferably located beneath a surface structure. Thus, it is desirable to provide conduits of sufficient strength to support the surface structure and the impact loads caused by its use. In this manner, bridging or reinforcing members in the surface structure over lines of drainage may be avoided.

Conduits used for subterranean lines of drainage preferably comprise a surrounding cohesionless arenaceous or sandy-like filter material about a cohesionless interstitial core material such as selectively sized gravel or the like. Thereby, contaminants such as silt and the like which may be carried by percolating ground water or by water penetrating the foundation surface are filtered by the arenaceous material which, having very small interstices, acts as a barrier to the surrounding foundation material while maintaining its permeable and porous characteristics. Thus, interstices in the core materials also remain permeable. Conduits of this type are preferred over fabricated conduits known in the art such as those commonly called "tile drains" or the like, because the entire area of the present type conduit is permeable, and, therefore, better suited to collecting water. However, the methods and machines formerly known in the art are not capable of economical construction of such conduits.

To insure that any blanket or lining placed on a foundation is properly supported, the dissimilar conduit materials should each be compacted to sufficient density. It is preferred that each of the materials, when being compacted, shall not be mixed or contaminated with each other, since interstices in the core materials may thereby be filled and the conduit made less permeable.

The usual course of construction of surface structures of the type and character here inclosed, particularly those having an impervious rigid or semi-rigid blanket or lining (such as concrete, asphalt, and the like) involves the accurate fine grading or trimming of a firm, densified earth foundation to neatline dimensions, free of leases, pockets, streaks or imperfections to insure that the surface structure is uniformly supported. Thus, the subgrade or foundation including subterranean lines of drainage, being contiguous with the other foundation portions and the surface structure, are generally included in the foundation preparation operations above described. Machines and equipment known in the art which perform fine grading or trimming operations normally attack the foundation in a milling-like manner transversely to the longitudinal direction of travel of the machine to obtain the smooth, planed foundation required. Trimming equipment of the character used in such operations is described in United States Letters Patent 2,867,046 issued to Josef Baer on January 6, 1959, and owned by the present assignee of the present application.

As earlier stated, the most effective use of subterranean lines of drainage is beneath the surface structure, and therefore, conduits are normally constructed parallel with the direction of travel or flow on the surface structure, and thus, are longitudinal. Methods and equipment formerly known in the art used in connection with making permeable conduits, when operated after fine grading or trimming operations are completed, may so disturb the prepared earth foundation that the foundation areas about conduits are seriously damaged or destroyed. Similarly, fine grading or trimming operation performed after a conduit is made may cause the conduit to become so contaminated with foundation materials that subsequent costly conduit repairing and cleaning operations need be performed. The present invention provides means which, when employed as an accessory or component of other equipment, will overcome such problems.

Each of the methods and machines formerly employed in making any of the several types and kinds of conduits for subterranean lines of drainage, have separately required at least (1) an excavating or trenching operation; (2) an arenaceous filter backfilling operation; (3) filter densifying operation; (4) a subsequent core excavating or trenching operation upon the arenaceous filter material; (5) a core backfilling operation; (6) a core densifying operation; (7) a top arenaceous filter backfilling operation to complete the filter surround of the core; and (8) a top filter compacting operation. In each of the several operations enumerated, material handling equipment is required to pick up and dispose of excavated spoil, in addition to each of the many specialized machines or devices needed to perform the work.

Although the present invention is described and disclosed, for the most part, with independent transport means for moving the device and structure along its intended work path, a greater functional advantage may be realized when the combined components of the present invention are used as an attachment or accessory to other machines such as trimming machines, excavating machines, trenching machines, and the like. However, in order to avoid descriptive redundancy, embodiments of the invention as an attachment or accessory carried on each of the several types and kinds of other machine units is omitted.

The method of the present invention, generally described, operates to form a permeable conduit in an open trench in the foundation for a surface structure, by laying against the bottom wall of the trench a layer of relatively dense interstitial material, laying against the side walls of the trench layers of the same or a similar material, and while maintaining the resultant side wall layers in position against the side walls of the trench, laying a layer of a relatively coarse interstitial material upon the bottom wall layer and between the sidewall layers of the denser material. In most instances, it is further desirable to cover the core layer of coarse material with a second horizontally-extending layer of denser material.

The apparatus of the present invention, generally speaking, comprises conduit laying means having a plurality each of material mixing chutes, bottomless compartments, conduit forming means, material laying strike-off shoes and densifying means. The structure here disclosed is juxtapositioned to an intended work area independently of its carrier, wherein the device and structure is moved over a previously excavated line of drainage or trench by its carrier, articulated within its framework perpendicularly to the vertical plane of the trench and lowered from its framework to a pre-selected elevation within the trench.

Conduit materials are separately moved to the present machine by any conventional material handling means such as from a hopper storage through conveying means to the machine.

Each of the conduit materials from the respective chutes flows into a plurality of associated bottomless compartments, each capable of confining a separate and different material. The sides of each of the compartments vary in depth according to the lowest elevation desired for each of the materials to be laid. The sides of the compartments also conform to the cross sectional configuration of each of the material sections to be laid. Thus, the compartment sides provide conduit forming means.

The rear panel of each of the respective chutes is provided with a rearwardly sloping sledge-like material laying strike-off shoe conforming to the configuration of the upper section of the surrounding filter section. In this manner, the uppermost elevation of each of the conduit materials is caused to be laid down and struck off.

Densifying means are provided for each of the material compartments. Each densifying unit is so attached to each of the compartments that vibration is set up in the compartment sides which causes the material to flow evenly and to densify about the conduit forming sides of the compartment. Each of the densifying means is provided with a bottom plate causing a perpendicular vibration to be set up on top of the material being laid in the trench, thus penetrating the material itself in the trench.

It is an object of this invention to provide a method and apparatus for making permeable conduits for subterranean lines of drainage, in a series of composite operations, to backfill, form and densify several porous materials, each of a selected size in previously excavated trenches.

Other objects of the present invention are to provide on an improved machine for making permeable conduits which will achieve optimum economy in doing such work; to provide a machine for laying a drain pipe within the permeable conduit in a continuous operation with the making of the conduit; and to provide a machine which will make a permeable conduit in a configuration conforming to any desired shape.

Various other objects will be manifest from the description following the present preferred forms of the invention, taken in connection with the accompanying drawings, wherein:

FIG. 3 is a front elevational view of a portion of the apparatus of the present invention, showing the position of the transport means and the conduit laying means as it may be used for making conduits on a sloping work face.

FIG. 4 is a rear elevational view of a plurality of permeable conduit laying means according to the invention, as they may be mounted as an attachment or accessory to single slope equipment for canals, levees, dams or the like.

FIG. 5 is the fragmentary cross sectional view of a typical square type conduit of the type and kind contemplated to be made with the use of the present invention.

FIG. 5A is a fragmentary cross sectional view of a typical trapezoidal type conduit of the type and kind contemplated to be made with the use of the present invention.

Figure 1:
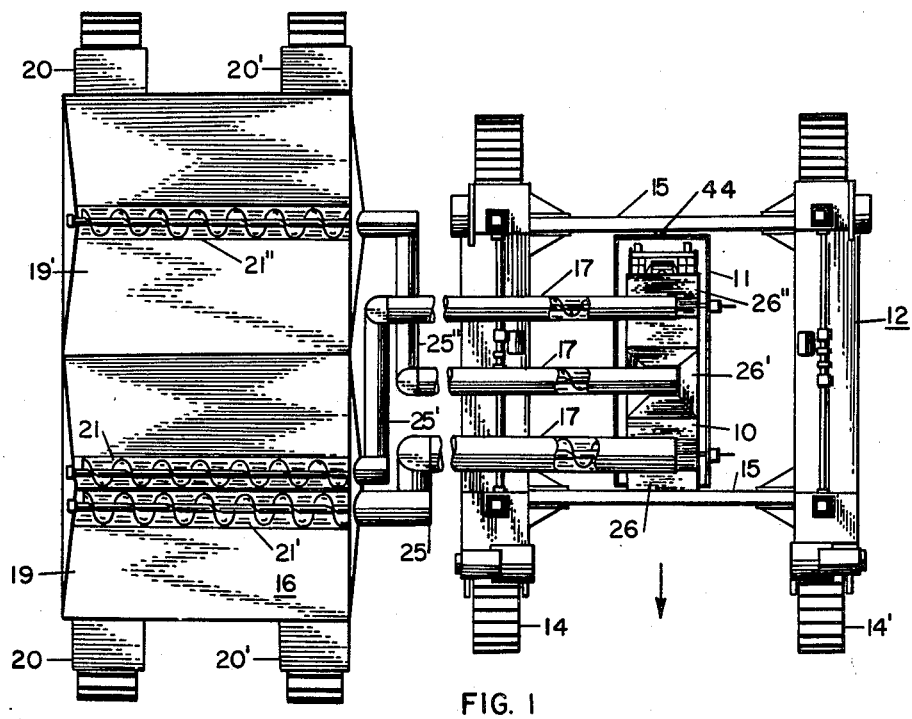
FIG. 1 is a top plan view of an embodiment of the present invention showing the conduit laying means mounted in conduit means framework, and carried by a transport means; including, also, a top plan view of a material handling system which may be used in combination with the conduit laying means.
Figure 2:
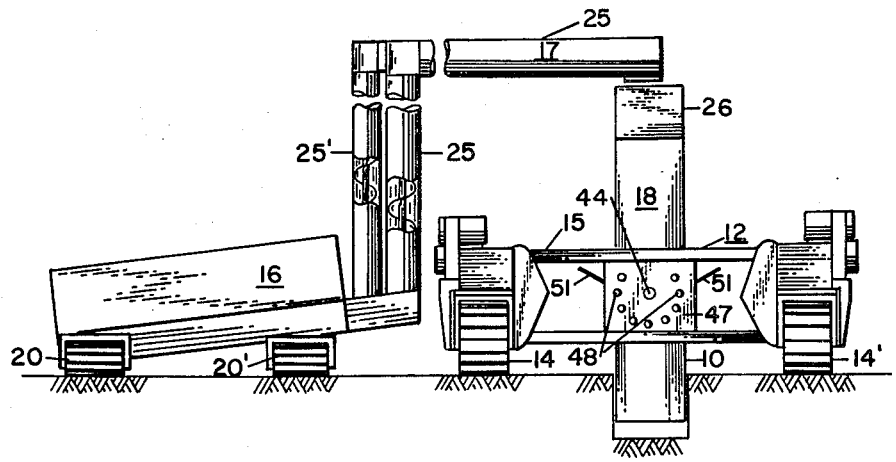
FIG. 2 is a front elevational view of the structures of FIG. 1.

Referring now to the drawings, and more particularly to FIGURES 1 through 4, the conduit laying means of the present invention, generally designated by the numeral 10, mounted in conduit means framework 11, is shown carried by a transport means generally designated by the numeral 12 in FIGURES 1, 2, and 3. In FIGURE 4 a further embodiment is shown wherein means 10 is attached to a transport framework 13 as an accessory such as to a single slope excavating or trimming machine. It may be noted that transport means 12 and transport framework 13 are similar in character in that each basically comprises a pair of transport vehicles 14 and 14′, here illustrated as a pair of independent, self-propelled, endless tracked, vehicles having a framework 15 disposed therebetween. Although it is not necessary that transport vehicles 14 and 14′ be independent, self-propelled or even tracked, the advantages of independently juxtapositioning either of the frameworks 15, and thereby conduit laying means 10, to a work face, by these means may be observed from the drawings.

It has been found in practice that the present invention is limited in its rate of work by the rate at which the several conduit materials are supplied to conduit laying means 10. This may be better understood when consideration is given to the fact that conduits of this type are usually about three feet by three feet, thereby requiring approximately one-third of a cubic yard of the several conduit materials per foot of travel. Some excavating, trenching, trimming and fine grading machines average as much as twelve feet per minute travel. Under these conditions, as much as two thousand cubic yards of the several conduit materials need be supplied to each conduit laying means 10 every eight hour work shift. Although any conventional material handling means known in the art is suitable for moving the several conduit materials to conduit laying means 10, a further embodiment of the present invention, including a material handling system capable of handling such extreme quantities of materials, is here disclosed.

The material handling system here disclosed includes a traveling storage means 16, a conveying means generally designated by the numeral 17, and a chute mixing means generally designated 18. The material handling system is intended to move at the same rate of speed as conduit laying means 10.

Traveling storage means 16 comprises a plurality of partitioned hopper receiving means 19 and 19′ mounted on a transport carriage such as endless tracks 20 and 20′. Means 16 is mounted on its transport carriage at an angle as shown to advantage in FIGURE 2, in order that vehicles commonly used in the construction industry to haul materials may easily discharge respective conduit materials into means 16. It may be observed in FIGURE 1 that hopper receiving means 19 and 19' are provided with a plurality of discharge means such as screw conveyors 21, 21' and 21" at the bottom of hoppers 19 and 19'. Since the surrounding arenaceous filter material may be separately laid; that is to say, the bottom and the sides of the filter may be laid at one time and the top portion of the filter at another time, or in any other alternative manner as herein later described, hoppers 19 and 19' may be provided with more than one discharge means such as conveyors 21 and 21'. It is thus intended that each hopper means is provided with as many discharge means as required for the number of laying means which may use the same conduit material. Similarly, as many hopper receiving means may be provided in traveling storage means 16 as the number of different types and kinds of conduit materials which may be used. Typical permeable conduits in subterranean lines of drainage are shown to advantage in FIGURES 5 and 5A wherein the cohesionless arenaceous filter surround is designated by the numeral 22, the core of the conduit is designated 23, and the surface structure by the numeral 24. It is preferred that the several materials not be mixed or contaminated, and, therefore, separate hopper means such as means 19 and 19' are desirable.

Conveying means 17 comprises a plurality of material handling means such as screw conveyors 25, 25' and 25". Screw conveyors 25, 25' and 25" carry the several conduit materials to each of a plurality of mixing chute means 26, 26' and 26" which are connected to respective conduit laying means as herein later described.

Mixing chute means 26, 26' and 26" comprise a box-like chute having a plurality of downwardly sloping baffle plates 27, shown to advantage in FIGURE 4. Plates 27 are alternately opposed in spaced relationship to each other within the several mixing chute means. As the material is discharged into each of the several chutes, it is caused to be alternately diverted in the direction opposite from its former path, against the opposite wall of the chute means, and the material is mixed in its cascading-like fall through the chute.

Figure 6:
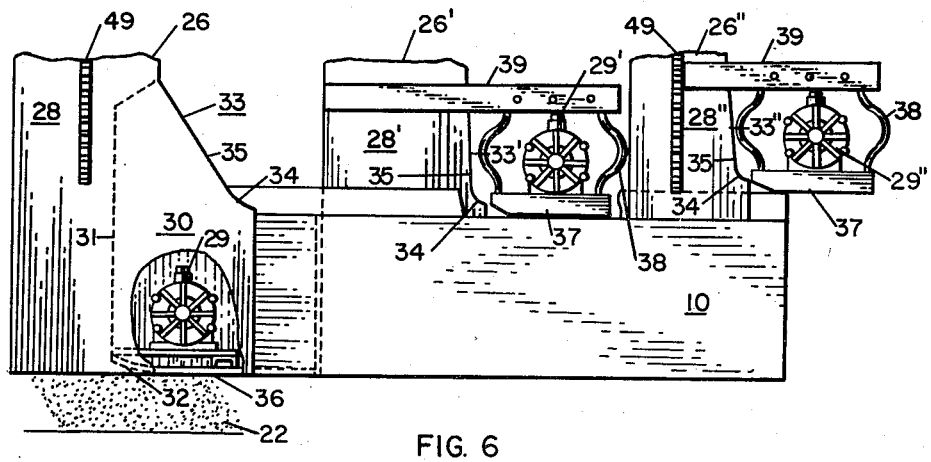
FIG. 6 is a side elevational view to a larger scale, of the conduit laying means of one embodiment of the present invention.
Figure 7:
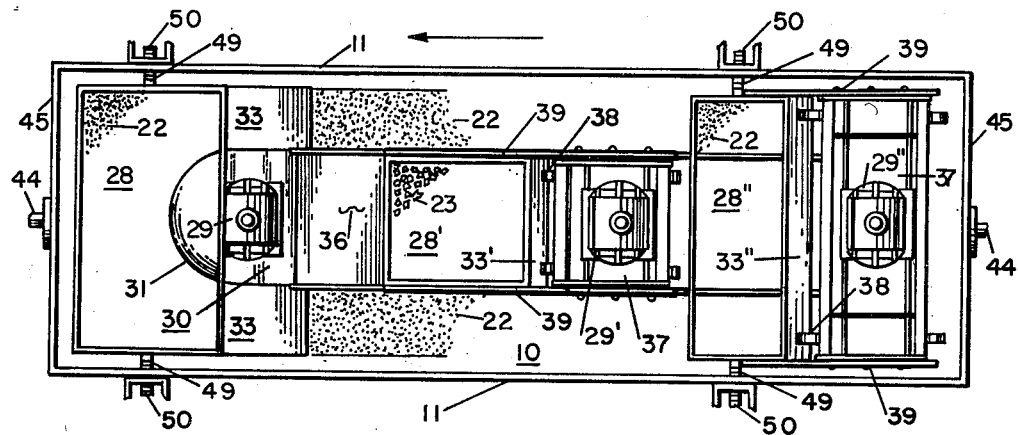
FIG. 7 is a top plan view of the device and structure of FIG. 6.

FIGURES 6 and 7 show to advantage conduit laying means 10. Means 10 comprises a plurality each of respective bottomless box-like material distributing compartments for each of the several conduit materials, such as compartments 28, 28' and 28"; vibratory compacting means for agitating and densifying each of the conduit sections, such as impactors 29, 29' and 29"; and a conduit forming means generally designated by the numeral 30. FIGURE 6 is illustrative of the manner in which chute means 26, 26' and 26" may issue into respective conduit laying means compartment 28, 28' and 28". It may be expedient to fit each of the respective chute means and each of the respective compartments with a bolting flange whereby each of the respective components may be bolted together in order to epedite assembly and disassembly of the units.

Each of the several distributing compartments is similar in character and varies only in respect to size and according to the type of materials to be laid by each of them. Thus, it appears that a description of one of the compartments, including, however, statements of modifications which are necessary to lay the several types of conduit materials may suffice for all.

The method of laying the several conduit materials with the form of the invention as illustrated in FIGURES 6 and 7 is such that the conduit laying means 10 is carried at an elevation above the bottom of a previously excavated trench which is equal to the thickness of the bottom portion of the filter surround desired as shown to advantage in FIGURES 2 and 3. In this manner, the filter material from chute means 26 may flow through distributing compartment 28, and around the sides and bottom of conduit forming means 30. As shown to advantage in FIGURE 7, conduit forming means 30 is a U-shaped member, the legs of which extend from the rearward portion of compartment 28 to the end of means 10. The legs of forming means 30 may be perpendicular or at an angle so as to conform to the configuration desired for a given conduit such as either of the configurations of conduits shown in FIGURES 5 and 5A. A rounded nose portion 31 is provided on conduit forming means 30, in the rear portion of compartment 28, so that the material in compartment 28 may be directed about it. Similarly, as shown to advantage in FIGURE 6, a rounded laying shoe 32 is provided on the front bottom portion of forming means 30 to lay the bottom section of the filter surround as earlier stated. It will be noted that the front wall of compartment 28' is extended to the terminal of shoe 32 and to the bottom of forming means 30 whereby compartment 28' is a separate bottomless compartment. In this manner, core material flowing from mixing chute means 26' into compartment 28' is laid down on top of the bottom portion of the filter surround, and confined at the sides of conduit forming means 30. It is desirable to confine the core material between the sides of means 30 while it is being densified, as later described, so that it does not become contaminated with the filter material at the sides of the conduit.

Compartment 28" extends across the top of both core 23 and filter 22 sides. Therefore, filter material flowing from mixing chute means 26" into compartment 28" is laid down on top of core 23 and the sides of filter 22 to complete the top portion of filter surround 22.

The trailing rear sides 33, 33' and 33" of respective compartments 28, 28' and 28", shown to advantage in FIGURE 6 provide a rearwardly sloping, sledge-like, material laying, strike-off means which are not unlike the sledge-like strike-off float body shown and described in copending application Serial Number 341,694, filed January 31, 1964, for Method and Apparatus for Paving slopes by the present applicants. The bottom of the sledge-like members is smooth, slightly rearwardly sloping flat panels designated 34, the forward terminal of which extends upwardly at an angle to provide a sloping front wall 35. Wall 35 engages the conduit material in its path and forces the surplus material ahead of it, while panel 34, in a grading-like motion, smooths the material to grade and similarly pushes excess material ahead of it.

In laying down materials, as opposed to pushing, bull-dozing or grading materials, it is desirable that the angles of attack of the material laying means and the strike-off smoothing means be at some marginal angle less than the angle of natural repose of the material. Thus, walls 35, 35', and 35" and panels 34, 34' and 34" are sloped at an angle near the angle of natural repose of the material intended to be laid by the several means.

In making a conduit in the manner shown to advantage in FIGURES 3 and 4, wherein the top portion of the filter surround conforms to the sloping foundation, wall 35" and panel 34" may also conform to the configuration of the slope. Densifying means 29", more fully later described, in such event, should be mounted so as to conform to the slope configuration.

Densifying means, such as integral vibratory surface impactors 29, 29' and 29" commonly known in the art, are provided. Impactor 29 is rigidly mounted on a platform 36 suitably fastened shoe 32. Since conduit means 10 is an integral rigid structure, conduit forming means 30 and the several compartments are caused to be vibrated by impactor 29. Thus, the several conduit materials are induced to flow freely. At the same time, the densifying force of impactor 29 is directed primarily downwardly through shoe 32 to densify the material being laid under shoe 32, and secondarily, through the sides of conduit forming means 30 to densify the sides.

Impactors 29' and 29" are typical surface type units commonly known in the art having a pan type base and mounting framework such shown at 37 and 38 respectively. Integral eccentric type vibratory generators, such as shown for impactor 29, are mounted on bases 37 for both impactors 29′ and 29″. Power is supplied to each of the vibratory generators from any conventional source. The mounting frameworks 38 of impactors 29′ and 29″ are rigidly fastened to respective compartments 28′ and 28″ by a pair of arms 39. Vibration is transmitted through arms 39 into respective compartments 28′ and 28″, and material is thus caused to freely flow. However, the densifying force of impactors 29′ and 29″ is directed primarily downwardly through bases 37 to densify the separate materials being laid under the bases. It will be noted that bases 37 are each equal in width with the respective compartments with which each of them is associated.

Figure 8:
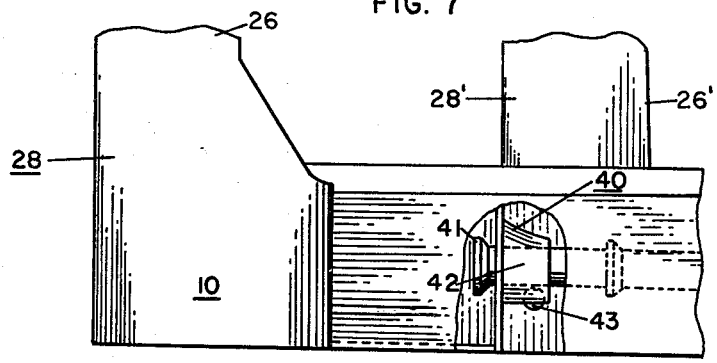
FIG. 8 is a fragmentary side elevational view of the device and structure of FIG. 6 showing to advantage method and means of laying pipe within the conduit of the type and kind contemplated to be made with the use of the present invention.

Referring to FIGURE 8 a further embodiment of the present invention is shown. The front wall portion of compartment 28′ is provided with a hooded pipe laying means 40. Sections of pipe such as shown at 41, may be inserted through an aperture 42 provided in the front wall portion of compartment 28′, and over a roller 43. As conduit laying means 10 advances, conduit core materials in compartment 28′ flow around successive sections of pipe 41 and a pipe may thus be laid within a section 23 as shown to advantage in FIGURES 5 and 5A. It may be desirable to lengthen the closure made by conduit forming means 30, shoe 32 and the front wall portion of compartment 28′ to provide a larger work space for one placing pipe as aforesaid.

Figure 9:
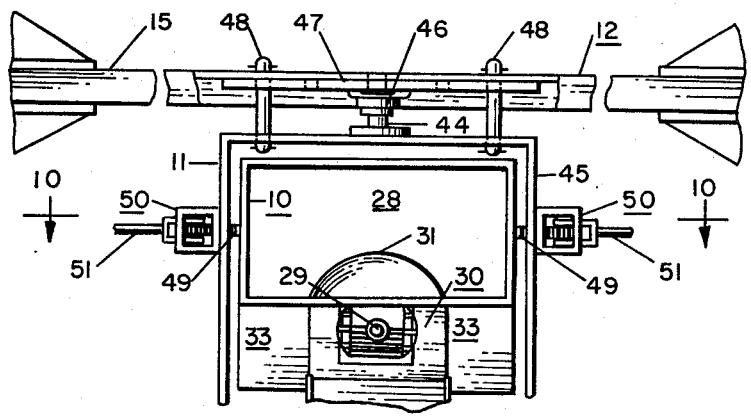
FIG. 9 is a fragmentary top plan view of the apparatus of FIGS. 1–3, 6 and 7, showing to advantage means by which the conduit laying means of the present invention may be articulated to operate on level or sloped ground.

FIGURE 9 shows to advantage the means by which conduit laying means 10 may be vertically positioned in a trench. Since both the front and rear positioning means are identical, a description of one shall suffice for both means.

Conduit laying means framework 11 is provided with a fixed shaft 44 rigidly mounted on the centerline of a front and rear framework plate member 45. Fixed shaft 44 is received into a bearing 46 suitably fastened to positioning plate members 47 on transport framework 15, as is shown to advantage in FIGURES 2 and 3. Plate members 45 and plate members 47 are provided with a series of holes drilled about a turning circle. When conduit laying means 10 and conduit framework 11 are articulated to a desired position, a pair of carrier pins 48 is provided to be inserted into respective holes in plate members 45 and plate members 47 to hold means 10 and framework 11 in place. If it is desired to articulate means 10 and framework 11 the pins 48 are removed.

Figure 10:
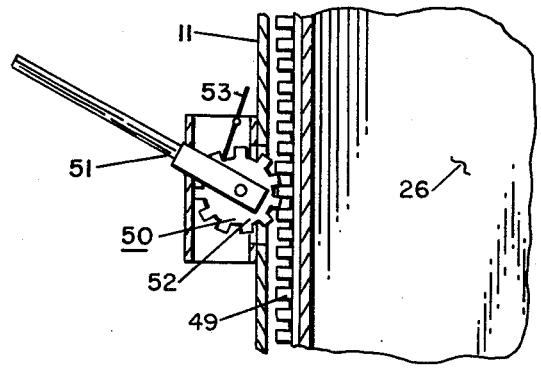
FIG. 10 is a sectional view taken along line 10—10 of FIG. 9 and showing means by which the conduit laying means may be raised and lowered in a trench and be adjust to a desired elevation within a trench.

Raising and lowering means for conduit laying means 10, such as that shown to advantage in FIGURE 10, may be used to position laying means 10 in a previously excavated trench. As illustrative of such means, raising and lowering means shown in FIGURE 10 comprises a rack 49 securely fastened to conduit laying means 10, and a reversible ratchet type jacking means 50. Racks 49 are also shown to advantage in FIGURES 6 and 7. A lever arm 51 attached to means 50 is operated in a pumping-like manner, engaging means 52 causes conduit laying means 10 to be raised or lowered as engaging means 52 rotates in rack 49. A locking means 53 is provided to hold or secure engaging means 52 after it has been rotated.

What is claimed:

1. Apparatus for formation of a permeable conduit in an open trench in the foundation for a surface structure, by movement of the apparatus along the trench, said conduit being composed of a core of relatively coarse interstitial material separated from the trench walls by a layer of denser interstitial material, comprising a plurality of bottomless distributing compartments spaced apart in the direction of movement of the apparatus, each compartment being defined by front and rear walls, with respect to the direction of movement of the apparatus, and opposite spaced sidewalls joining the front walls to the rear walls, the side walls of the front compartment being spaced apart farther than the side walls of the next compartment to be offset outwardly thereof so that a wider layer may be deposited through the front compartment than through the next compartment, forming means extending forwardly from the side walls of said next compartment to at least the rear wall of said front compartment and vertically to the bottom edges of the walls of said front compartment, the bottom edge of the rear wall of said next compartment being spaced above the bottom edges of the walls of said front compartment, said forming means being operable in movement through the trench to divert a central portion of the material discharged from the front compartment into the trench toward the side walls of the trench and hold that material against those side walls, while material from the next compartment is discharged between the material held against the side walls, and means operable to deliver a relatively dense interstitial material to said front compartment and relatively coarser interstitial material to said next compartment.

2. The apparatus of claim 1 in which said sidewalls of at least said front compartment extend at an angle to the vertical when the apparatus is in position in the trench, so as to define inclined side wall layers of said denser material.

3. The apparatus of claim 2 in which said forming means has side walls each of which extends at a similar angle to the vertical, so that the opposite side surfaces of each side wall layer are substantially parallel to each other.

4. The apparatus of claim 1 including means for holding said compartments above the bottom wall of the trench to define a space for a bottom layer of said relatively denser material.

5. The apparatus of claim 4 in which the rear walls of the compartments are inclined rearwardly with respect to the vertical and the direction of movement of the apparatus and terminate in downwardly curved, rearwardly extending surfaces which are rearward of their upper ends and act as strike-off members, said surfaces of the front compartment respectively extending laterally between the opposite side walls thereof and the adjacent one of said forming means, the said surface of said next compartment extending between the opposite side walls thereof, the lowermost edges of all said surfaces being spaced above the lowermost surfaces of the walls of said front compartment by substantially the desired height of the core.

6. The apparatus of claim 5 including means for densifying the material laid by each compartment.

7. The apparatus of claim 5 in which said forming means includes a pair of vertically extending walls which extend from the rear of the rearward most compartment into said front compartment and are formed therein with a curvilinear nose surface concave with respect to the front compartment.

8. The apparatus of claim 7 including a bottom laying shoe member horizontally disposed between the lowermost portion of said walls of said forming means, said shoe member extending forwardly from the front wall of said next compartment, into said front compartment where it curves upwardly into the lowermost portion of the curvilinear nose surface portion of said forming means in the front compartment.

9. The apparatus of claim 8 including pipe laying means comprising an aperture in the front wall of said next compartment, a hood member about said aperture on said front wall inside the next compartment, and a roller member disposed between the bottom rearward most leg portions of said hood.

10. The apparatus of claim 8 including a vibratory impactor operable to vibrate said shoe member vertically to densify the material distributed through said front compartment.

11. Apparatus for formation of a permeable conduit in an open trench in the foundation for a surface structure, by movement of apparatus along it, said conduit being composed of a core of relatively coarse interstitial material separated from the trench walls by a layer of denser material, comprising at least three bottomless distributing compartments spaced apart along the direction of movement of the apparatus and each defined by front and rear walls spaced apart in the same direction and by opposite spaced side walls joining the front walls to the rear walls, the side walls of the front and rear compartments being spaced apart approximately the same distance but farther than the side walls of the intermediate compartment to be offset outwardly thereof so that wider layers of material may be deposited through the front and rear compartments than through the intermediate compartment, forming means including vertical wall members extending at least from the front wall of the rear compartment to the rear wall of the front compartment and extending vertically to the bottom edges of the walls of said front compartment, said forming means being operable in movement through the trench to divert a central portion of the material discharged from the front compartment toward the side walls of the trench and hold that material against those side walls while material from the intermediate compartment is discharged between the layers held against the side walls, the bottom edges of the rear walls of the intermediate and rear compartments being progressively spaced higher above the bottom edges of the front compartment so that three superimposed layers may be formed of material discharged from those compartments, and means operable to deliver a relatively dense interstitial material to said front and rear compartments and a relatively coarser interstitial material to said intermediate compartment.

12. The apparatus of claim 11 including means for holding said compartments above the bottom wall of the trench to define a space for a bottom layer of said relatively denser material.

13. The apparatus of claim 12 including shoe members disposed immediately rearwardly of each of said compartments and positioned to lie against the upper surface of the material discharged by its respective compartment, and a vibratory impactor operable to vibrate each shoe member vertically to densify the material distributed through the associated compartment.

References Cited by the Examiner
UNITED STATES PATENTS

| | | | |
|---|---|---|---|
| 940,061 | 11/09 | Ransome | 94—46 |
| 978,836 | 12/10 | Bowslaugh | 61—11 |
| 1,355,066 | 10/20 | Smith | 61—11 |
| 1,463,561 | 7/23 | Sommer | 61—72.1 |
| 2,035,627 | 3/36 | West | 94—46 |
| 2,123,243 | 7/38 | Janert | 61—72.2 |
| 2,201,493 | 5/40 | Jorgensen | 94—40 |
| 2,255,346 | 9/41 | Baily | 94—46 |
| 2,551,110 | 5/51 | Fuller | 61—63 |
| 2,680,416 | 6/54 | Russell | 61—72.2 |
| 2,738,745 | 3/56 | Harpold | 61—72.1 |

FOREIGN PATENTS

| | | |
|---|---|---|
| 337,244 | 8/19 | Germany. |
| 862,616 | 1/53 | Germany. |

EARL J. WITMER, *Primary Examiner.*